Feb. 11, 1958 D. F. GARMAN 2,822,712
FASTENING DEVICE
Original Filed July 6, 1954

INVENTOR
DONALD F. GARMAN
BY
*H. G. Lombard*
ATTORNEY

United States Patent Office 2,822,712
Patented Feb. 11, 1958

2,822,712

FASTENING DEVICE

Donald F. Garman, Cleveland, Ohio, assignor to Tinnerman Products, Inc., Cleveland, Ohio, a corporation of Ohio Original application July 6, 1954, Serial No. 441,389, now Patent No. 2,752,805, dated July 3, 1956. Divided and this application May 12, 1955, Serial No. 507,851

2 Claims. (Cl. 81—3)

This invention deals with the fastening of sheet metal spring nuts in secured position on associated studs, and is directed, more particularly, to an improved construction for a sheet metal spring nut which is adapted to be assembled onto a tool and easily and quickly applied by the tool to secured position on a cooperating stud in a single expeditious operation. This application is a division of prior copending application Serial Number 441,- 389 filed July 6, 1954 and issued July 3, 1956 as Patent No. 2,752,805.

The arrangement is such that the improved spring nut of the invention has a special construction by which the spring nut is adapted to be assembled onto a special tool for application to secured position on a stud with relatively greater speed and facility than heretofore known fastening devices of this character, and in a manner whereby the spring nut is secured by a pushing action of the tool directly thereon without need for bolstering the head of the stud or the part to which the stud is connected. This is highly advantageous in instances wherein the stud is connected to or extends from a relatively fragile plastic or glass part, for example, such that it is more or less necessary for the spring nut to be applied to the stud without axial pull or distortion thereon which would break the stud or fracture the relatively fragile glass or plastic part to which the stud is connected.

Another example of the highly practical and advantageous use of the invention resides in the preparation of sand cores for casting wherein the sand cores are held together by elongate rods and spring nuts secured on the ends of the rods which must necessarily be applied solely by a pushing action on the spring nuts without pulling on or disturbing the rods in any way in which the sand cores would be deformed or damaged by unintended movement of the rods therein.

The improved spring nuts of the invention and the tool for applying the same are adapted for a wide range and variety of applications and uses but are particularly advantageous in what are known as blind fastening assemblies wherein both sides of the parts secured are not conveniently or readily accessible and the final fastening of the parts is more advantageously or necessarily performed by an operation taking place entirely from the accessible side of the assembly.

With objects apparent from the foregoing in view, further objects and advantages, and other new and useful features in the construction, arrangement and general combination of parts of the invention will be apparent as the following description proceeds with reference to the accompanying drawings, for purposes of illustration but not of limitation, in which like reference characters designate like parts throughout, and in which.

Figure 5:
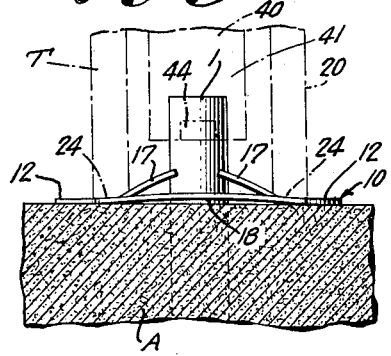
Figure 4:
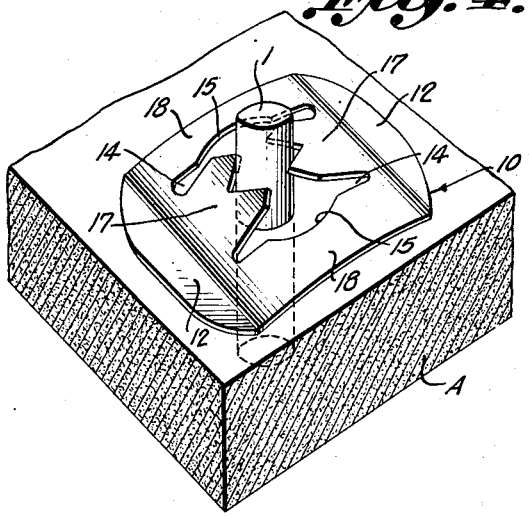

Fig. 4 is a similar perspective view of the spring nut showing the same as applied by the tool to secured position over the end of the projecting stud; and, Fig. 5 is a sectional view showing the spring nut in edge elevation as applied to secured position on the stud with the respective elements of the tool represented in broken lines in the position of engagement with the spring nut and with the projecting stud on which the spring nut is secured.

Referring now, more particularly, to the drawings, there is shown in Fig. 4 a fastening arrangement in which a part A is secured to an associated part by a spring nut 10 in accordance with the invention applied to connecting means in any of the forms of a separate or integral plain stud, barbed shank, rivet, nail or threaded fastener, or the like. In the present illustration, for example only, the part A represents a sand core held together by elongate rods having free ends which define projecting studs 1 to which the spring nuts 10 are secured solely by a pushing action on said spring nuts without moving or disturbing the rods in any way in which the sand core would be mutilated or deformed by unintended movement of the rods therein. In a related type of fastening assembly, the part A may be a relatively fragile plastic or glass part formed with one or more integrally molded studs 1 or equivalent studs provided in the manner of inserts embedded therein in the molding operation, or with said studs extending through aligned openings in two or more parts to be secured with the free ends of the studs 1 projecting beyond the assembled parts in position for the application of spring nuts 10 thereto for securing said parts in a completed installation.

Figure 1:
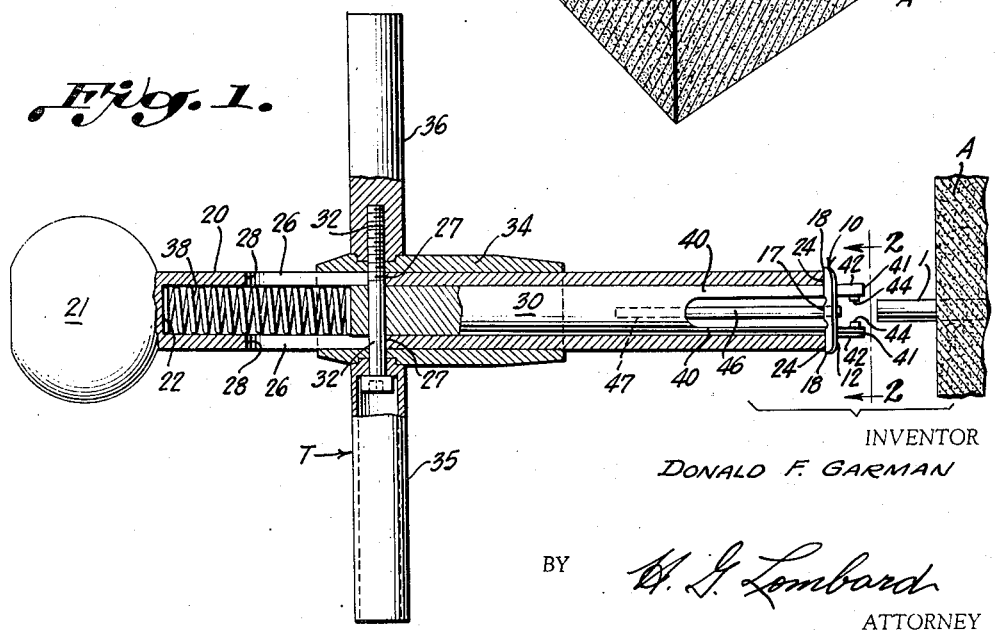
Fig. 1 is a view showing a spring nut in accordance with the invention as assembled on guide fingers on the forward end of a special tool, shown in section, and with the spring nut in position to be applied by the tool to secured position over the end of a projecting stud of an assembly to be secured.

It will be understood, further, that in many assemblies of this character, the head portions of the studs or the areas to which the studs are connected are not usually accessible for bolstering the same during the application and tightening of the spring nuts 10 thereon and accordingly, it is necessary or desirable to apply the spring nuts by an operation taking place entirely from the accessible side of the assembly. In this relation, the special tool, Fig. 1, is particularly advantageous in applying and tensioning a spring nut 10 entirely from the accessible side of an assembly without requiring the associated stud 1 to be bolstered from the opposite side of the assembly, as is necessary in the application of a spring nut by a thrust-type tool, for example, in which there is considerable danger of mutilation, cracking or breakage of such relatively fragile parts in this respect also.

Figure 2:
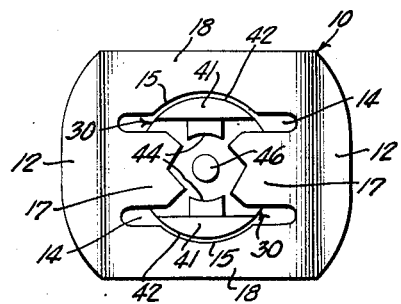
Fig. 2 is a view along line 2—2 of Fig. 1, looking in the direction of the arrows, and shows the spring nut in bottom plan on an enlarged scale as assembled on the guide fingers on the forward end of the tool.
Figure 3:
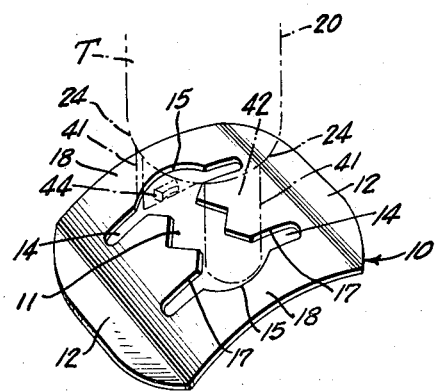
Fig. 3 is a perspective view of the spring nut as seen from the upper surface thereof, and shows the special construction of the spring nut for fitting the same in assembled relation on the guide fingers at the forward end of the tool, shown in broken lines.

The spring nut devices 10 are essentially sheet metal locking plates or clips which are constructed from relatively thin sections of any suitable sheet metal, preferably spring metal such as spring steel or cold rolled metal having spring-like characteristics. The spring nut 10 may be provided from blanks of various outlines but, as shown in Fig. 2, is most economically constructed from a simple generally rectangular section which may be provided at relatively low cost from ordinary strip stock with little loss or waste of material. The blank preferably is provided with rounded corners and is bent into the form of a generally bowed or arched body between end sections 12 which are of sufficient length to define substantial bearing surfaces or spring clamping elements capable of frictional sliding relation to the adjacent surface secured thereby upon tensioning of the spring nut 10 in fully applied fastening position.

At the substantial center or apex of the bowed or arched body of the spring nut, a stud receiving opening 11 is provided together with a pair of spaced parallel slots extending lengthwise on opposite sides of said stud receiving opening, said slots partially defining a pair of spaced, partially severed portions 18. The slots 14 include special laterally enlarged areas 15 on the sides thereof, which cut into the central sections of portions 18, and are so provided in the blank as to define a pair of cooperating substantial tongues 17 or the like, between the bowed or arched, partially severed side or bridge sections 18, extending lengthwise adjacent said tongues 17 and defining said resilient bowed or arched body of the spring nut 10.

In the completed spring nut 10, special recesses or holes are formed by the laterally enlarged areas 15 of the slots 14 and the adjoining space of said slots 14 adjacent the sides of the tongues 17. These special holes or recesses 15 provide for assembly of the spring nut 10 on the tool, Fig. 1, preparatory to the application and securing of the spring nut 10 on an associated stud 1, as hereinafter set forth. The extremities of said tongues 17 are at least equal to or slightly greater in width than the root diameter of the stud 1 and are preferably V-notched and oppositely disposed to cut into embedded relation with the stud in substantially equal biting engagement therewith in applied fastening position. The tongues 17, otherwise, have the corners thereof cutaway, preferably in a bevelled formation, as shown, to provide the extremities of said tongues 17 in a predetermined spacing suitable for clearing elements of the tool adapted to pass between said tongues 17 in the application and tightening of the spring nut 10 in secured position on the stud 1, as presently to be described.

Said tongues 17 preferably are relatively short and bent into substantially ogee formation to extend within or slightly outwardly out of the contour of the generally bowed or arched body of the spring nut 1 at the crown or apex thereof. The tongues 17, thus provided, are possessed of unusual inherent strength and sufficient resiliency to yield as necessary for the extremities thereof to admit therebetween a suitable stud 1 in any form of a separate or integral plain stud, barbed shank, rivet, nail or threaded fastener, or the like.

The arrangement, otherwise, is such that the bowed or arched body of the spring nut 10 provides a resilient spring locking plate which is somewhat more flexible than the usual spring nut. The tongues 17 are yieldable with respect to said bowed or arched body and relatively to each other in such a way that the V-shaped extremities of said tongues 17 are readily adapted for sliding along the smooth shank of a plain stud 1 or for snapping over the ribs of a ring-barbed stud in one direction in the manner of yieldable pawls sliding over a ratchet in what may be termed, a one-way clutch gripping action with the stud. The spring nut device 10, accordingly, may be speedily applied by the tool of the invention to secured position on a stud 1 by a substantially axial pushing force in a minimum of time and effort, and the bowed or arched body simultaneously depressed toward flat, as seen in Fig. 5, to tightly secured the same against the adjacent work A under a tensioned spring locking action.

It has been found that this most effective locking action of a spring nut 10 to provide a tight, rigid installation is best obtained when the generally arched or bowed body of the spring nut defined by the side sections 18, is depressed without any substantial pressure being exerted directly on the tongues 17; any substantial pressure on said tongues 17 prevents the spring nut from having easy sliding movement axially of a plain stud 1 or over the ribs of a barbed stud on being applied and often bends the tongues such that the extremities thereof are deformed out of position for most effective contact with the stud and thus have a tendency to slip and permit the spring nut to loosen from tensioned, finally applied position in a completed assembly.

The tensioning of the spring nut 10 may be performed in any suitable way for depressing the same, as aforesaid, but preferably by the use of a special tool comprising a pressure head designed to engage the arched or bowed side or bridge sections 18 and the end sections 12 without exerting pressure directly on said tongues 17. Thus, pressure may be applied to the generally arched or bowed body portions 18 of the spring nut 10 to depress and tension the same without likelihood of deforming the tongues 17; and accordingly, when the tool is withdrawn and the attendant pressure removed from the depressed body of the spring nut, the spring nut attempts to assume its initial, untensioned bowed or arched formation such that the extremities of the tongues 17 are urged inwardly under spring tension into locked biting engagement with the stud 1 in the fully applied position of the spring nut. The spring nut 10 is thereby secured to the stud 1 under a spring locking action wherein the tongues 17, in locked biting engagement with the stud, exert a downward force on the body of the spring nut, in conjunction with the upward reaction spring force applied to said tongues 17 by the depressed and tensioned body of the spring nut in attempting to assume its normal bowed or arched configuration.

Fig. 1 shows a tool T for applying and tensioning a spring nut 10 in secured position on a cooperating stud 1 by an operation taking place entirely from the accessible side of the assembly as is required in installations, such as previously described, in which it is impractical or inconvenient to bolster the stud 1 during the depressing action for tensioning the spring nut 10 in applied position on the stud. The tool T comprises a tubular barrel 20 having a hand grip or handle 21, a closed inner wall 22 and a generally circular outer end 24 defining a peripheral tool head adapted for applying the predetermined size of spring nut for which the tool is intended for use. Slideways 26 in said barrel define forward abutments or stops 27 and rearward abutments or stops 28. A plunger 30 is provided with a passage for a screw 32 extending through said slideways 26 aligned with holes in a slidable sleeve 34, and securing thereto a pair of rods 35, 36, providing trigger elements for said plunger 30. Coil spring 38 urges the plunger 30 to its normal forwardly projected position as limited by screw 32 engaging said stops 27, with the rearward stops 28 limiting the forward movement of the barrel 20 relatively to said plunger 30.

The plunger 30 is provided on its forward end with a pair of elongate resilient arms 40 having guide fingers 41 projecting a predetermined distance beyond the tool head 24 in the normal position of the tool as shown in Fig. 1. The guide fingers 41 are so formed that the outer sides thereof define outwardly inclined cam surfaces 42 tapering gradually outwardly from each other. On the inner sides of said guide fingers 41, there are provided a pair of opposite integral stud gripping jaws 44 having curved faces, as seen in Fig. 2, corresponding substantially to the outer contour of the stud 1 of the assembly of parts to be secured. The arrangement, otherwise, is such that the guide fingers 41 have cross sections in the form of chords corresponding to and slightly smaller than the contour of the special tool receiving recesses 15 in the spring nut 10 so as to be readily received in said recesses 15, as shown in Fig. 2, with the gripping jaws 44 adapted to pass freely between the bevelled corners of the tongues 17. Preferably, the plunger 40 is provided with a removable gauge pin 46 which has its inner end removably retained in an aperture 47 in said plunger 30 and its outer end in position to engage the end of the stud 1 to locate the jaws 44 for gripping the stud 1 at substantially the predetermined point in which the spring nut 10 is to be applied onto said stud 1 by the toll head 24 to the precise and most effective position intended.

The application of a spring nut 10 to secured position on its associated stud 1 is readily effected by first assembling the spring nut 10 onto the projecting guide fingers 41 of the tool as shown in Figs. 1 and 2. The guide fingers 41 readily slip through the tool receiving recesses 15 in the spring nut 10 and the gripping jaws 44 pass easily between the bevelled corners of the tongues 17 of the spring nut to a position in which the circular tool head 24 bears against the convex surface of the spring nut 10 as illustrated in Fig. 1. In this position the lateral edges of the elements 17 lie in planes disposed outwardly of the inner curved surfaces of the jaws 44.

The tool T with the spring nut 10 assembled on the guide fingers 41 is then fitted over the projecting end of the stud 1 to the precise location determined by the gauge pin 46 engaging the end of said stud 1. The gripping jaws 44 on the plunger 30 are thus located at the predetermined position for gripping said stud 1 and for the subsequent projection or pushing of the spring nut 10 onto said stud 1 by the tool head 24, but only to the extent of the predetermined forward movement of the tool head 24 relatively to the plunger 30 as limited by the rearward stops or abutments 28 on the barrel 20 when moved into contact with the screw 32 connected to said plunger 30.

The action is such that the gripping jaws 44 close upon and rigidly grip the stud 1 while the cooperating tool head 24 moves forwardly relatively thereto to depress and flatten the bowed or arched side sections 18 of the spring nut 10 against the adjacent face of the work A. Said peripheral tool head 24 is so designed as to engage, in any position of application, the bowed or arched side sections 18 and the end sections 12 adjacent the bases of the projecting tongues 17 such that no pressure is exerted on said tongues 17 which would tend to mutilate or distort the same out of their normal formation adapted for most effective fastening engagement with the stud 1. Said tongues 17, otherwise, are receivable in the bore of the tool head 24 and are thereby free to yield and flex as necessary upon actuation of the tool head 24 to such position of most effective fastening engagement with the stud 1.

Accordingly, with the spring nut assembled on the guide fingers 41 and the gripping jaws 44 thereon fitted over the end of the stud 1, the operator initially actuates the tool by holding steady one or both of the grips or trigger elements 35, 36, while pressing upon the ball-shaped handle 21 to move the barrel 20 and the tool head 24 thereon in a forward direction over said guide fingers 41. As the barrel 20 is moved forwardly, the coil spring 38 is compressed against the end of the plunger 30, and the tool head 24 on the end of the barrel 20 engages the outwardly inclined cam surfaces 42 on the guide fingers 41 to provide a gradual compression of said guide fingers 41 which causes the gripping jaws 44 thereon to move inwardly into fixed gripping engagement with the stud 1. At the same time, the tool head 24 pushes the spring nut 10 over the guide fingers 41 to a position in which the tongues 17 snap over the end of the stud 1 and spring into biting contact with the stud 1, following which the spring nut 10 is pushed completely off of the ends of the guide fingers 41 and onto the stud 1. The spring nut 10 readily slips over and off of the guide fingers 41 in this manner inasmuch as the tool receiving recesses 15 therein are loosely fitted about said guide fingers 41 while the extremities of the tongues 17 have sufficient clearance from the jaws 44 for this purpose, as aforesaid.

During this forward movement of the tool head 24 over the guide fingers 41, the gripping jaws 44 remain in fixed gripping engagement with the stud 1 as the spring nut 10 is pushed axially of the stud to a position in which the end sections 12 of the spring nut 10 engage the adjacent surface of the part A, whereupon the tool head 24 bears upon the bowed or arched side sections 18 to substantially flatten the same, thereby tensioning the body of the spring nut 10 and causing the tongues 17 to seat in biting locked engagement with the stud 1 as illustrated in Figs. 4 and 5.

It will be appreciated that in the final application and tightening of the spring nut 10 on the stud 1, the jaws 44 on the guide fingers 41 remain in fixed gripping engagement with said stud 1 as the tool head 24 moves forwardly relatively thereto to depress and substantially flatten the spring nut 10 in final position. Thus, the stud 1 on the end of a rod in a sand core, for example, is not moved or otherwise disturbed in any way in which the sand core would be deformed or damaged by unintended movement of the rod therein. Likewise, in the event that the part A is a relatively fragile plastic or glass part with the studs 1 integrally molded thereon, there is little pull or distortion on the studs which might cause cracking or breaking of the studs.

When the ball-shaped handle 21 of the tool is released, the compressed coil spring 38 is free to expand and accordingly, urges the barrel 20 rearwardly to its initial, normal position shown in Fig. 1. The cam surfaces 42 adjacent the ends of the guide fingers 41 thus clear the tool head 24 such that said guide fingers 41 are free to spring outwardly sufficiently for the jaws 44 carried thereby to disengage from the stud 1, whereupon the tool may be easily and quickly withdrawn.

When the tool is withdrawn and the attendant pressure removed from the depressed body of the spring nut 10, the spring nut naturally tends to assume its initial arched or bowed configuration, thereby forcing the V-shaped extremities of the tongues 17 inwardly toward each other to cut into and become embedded in the stud 1 in permanently locked relation therewith, as aforesaid. Preferably the body of the spring nut 10 is designed to assume a slightly bowed or arched formation in its fully applied position, as seen in Fig. 4, to retain the tongues 17 in such locked engagement with the stud 1 under continuously effective spring tension in a manner whereby the spring nut 10 is not subject to loosening or removal under the most severe conditions of shock, vibration, or the like.

The spring nut 10 preferably is constructed of relatively thin sheet metal the thickness of which is selected according to service requirements and the predetermined size of the parts to be secured thereby. The spring nut 10 is most effective when provided of spring metal suitably tempered and otherwise treated to give the desired toughness and hardness, particularly in the case of devices which are intended for heavy duty applications. A cheap and highly satisfactory spring nut in accordance with the invention may be provided from cold rolled metal such as cold rolled steel which is untempered but of a spring metal nature and capable of providing an effective and reliable securing device as and for the purposes described.

While the invention has been described in detail with a specific example, such example is intended as an illustration only inasmuch as the invention fully contemplates various modifications which may be provided without departing from the spirit and scope of the invention.

What is claimed is:

1. A fastener adapted to be applied in secured position on a stud extending from a relatively fragile part, by an associated tool having a tool head and guide fingers projecting longitudinally from said tool head for telescoping movement relative to said tool head and including inwardly extending jaws on said fingers for gripping said stud during application of said fastener to said stud to prevent damage to the connection of the said part and stud during said application of said fastener, said fastener comprising a sheet metal body defining a generally arched base provided with a stud receiving opening between a pair of spaced side portions, said base having slots defining stud engaging elements extending from said opening to junctions with said base, the central section of each of said portions adjacent said opening being notched outwardly to provide predetermined spacing between said central sections and the confronting sides of said stud, the corners of said elements at the free ends thereof being beveled to provide in combination with said notched sections of said portions, tool receiving holes adapted to receive said fingers and associated jaws of the tool to support said fastener on the tool in position to be engaged by said tool head for applying the fastener to secured position on said stud, the lateral edges of said elements lying in planes disposed outwardly of the inward extension of said jaws, said beveled corners providing clearance between said elements and said jaws during relative telescoping movement between the fingers and the tool head.

2. A fastener in accordance with claim 1, wherein said free ends of said elements are V-notched and wherein said slots are lengthwise directed and positioned on opposite sides of said opening and merging therewith.

References Cited in the file of this patent

UNITED STATES PATENTS

| | | |
|---|---|---|
| 2,169,181 | Kost | Aug. 8, 1939 |
| 2,341,063 | Tinnerman | Feb. 8, 1944 |
| 2,342,170 | Tinnerman | Feb. 22, 1944 |